United States Patent
Cornwell

(10) Patent No.: US 11,035,291 B2
(45) Date of Patent: Jun. 15, 2021

(54) MARINE OUTBOARD MOTOR WITH IMPROVED FLOW SENSING

(71) Applicant: COX POWERTRAIN LIMITED, Shoreham-By-Sea (GB)

(72) Inventor: Richard Cornwell, Shoreham-By-Sea (GB)

(73) Assignee: COX POWERTRAIN LIMITED, Shoreham-By-Sea (GB)

( * ) Notice: Subject to any disclaimer, the term of this patent is extended or adjusted under 35 U.S.C. 154(b) by 0 days.

(21) Appl. No.: 16/828,035

(22) Filed: Mar. 24, 2020

(65) Prior Publication Data
US 2020/0318533 A1    Oct. 8, 2020

(30) Foreign Application Priority Data
Apr. 4, 2019 (GB) .................................. 1904773

(51) Int. Cl.
| | |
|---|---|
| F02M 1/00 | (2006.01) |
| F02B 61/04 | (2006.01) |
| F02M 26/17 | (2016.01) |
| B63H 20/32 | (2006.01) |
| F02B 75/00 | (2006.01) |
| F02B 77/08 | (2006.01) |
| F02F 7/00 | (2006.01) |
| F02M 35/10 | (2006.01) |

(52) U.S. Cl.
CPC ........... *F02B 61/045* (2013.01); *B63H 20/32* (2013.01); *F02B 75/007* (2013.01); *F02B 77/081* (2013.01); *F02F 7/0002* (2013.01); *F02M 26/17* (2016.02); *F02M 35/10144* (2013.01); *F02M 35/10222* (2013.01); *F02M 35/10268* (2013.01); *F02M 35/10386* (2013.01)

(58) Field of Classification Search
CPC .... F02M 1/02; F02M 7/24; G01F 1/32; G01F 1/3209; G01F 1/3218; G01F 1/3227
USPC .......................... 123/437; 73/861.22, 861.24
See application file for complete search history.

(56) References Cited

U.S. PATENT DOCUMENTS

| | | | | |
|---|---|---|---|---|
| 3,818,877 | A | * 6/1974 | Barrera | ................. F02D 41/185 123/494 |
| 3,996,796 | A | 12/1976 | Adler et al. | |
| 4,235,205 | A | 11/1980 | Endo et al. | |

(Continued)

OTHER PUBLICATIONS

Combined Search and Examination Report issued in App. No. GB1904773.7 (2019).

(Continued)

*Primary Examiner* — John Kwon
(74) *Attorney, Agent, or Firm* — Barnes & Thornburg LLP

(57) ABSTRACT

A marine outboard motor is provided with an internal combustion engine comprising an engine block defining at least one cylinder, an air intake configured to deliver a flow of air to the at least one cylinder; and an air intake duct forming part of an air intake path for delivering the flow of air to the air intake. The engine further includes a flow sensing arrangement located in the air intake duct and comprising a flow meter configured to generate a signal indicative of a flow rate of the flow of air through the air intake duct, and a bluff body located in the air intake duct upstream of the flow meter, wherein the flow meter is a vortex shedding flow meter.

13 Claims, 6 Drawing Sheets

(56) References Cited

U.S. PATENT DOCUMENTS

| | | | | |
|---|---|---|---|---|
| 4,269,157 | A | * | 5/1981 | Fujishiro ............... F02D 41/185 |
| | | | | 123/478 |
| 4,275,694 | A | * | 6/1981 | Nagaishi ................... G01F 1/86 |
| | | | | 123/463 |
| 4,409,929 | A | | 10/1983 | Sasaki et al. |
| 4,418,578 | A | * | 12/1983 | Blechinger ........... G01F 1/3218 |
| | | | | 73/861.22 |
| 4,455,877 | A | * | 6/1984 | Blechinger ........... G01F 1/3209 |
| | | | | 73/861.22 |
| 4,455,985 | A | * | 6/1984 | Asayama .............. F02D 41/185 |
| | | | | 123/478 |
| 4,903,649 | A | * | 2/1990 | Staerzl .................... F02D 41/18 |
| | | | | 123/438 |
| 5,133,307 | A | | 7/1992 | Kurihara |
| 5,186,044 | A | * | 2/1993 | Igarashi ................. G01F 1/684 |
| | | | | 73/114.34 |
| 5,708,214 | A | * | 1/1998 | Kiguchi ................ G01F 1/3245 |
| | | | | 73/202 |
| 5,728,946 | A | * | 3/1998 | Sasaki ................... G01F 1/3272 |
| | | | | 73/861.22 |
| 8,056,424 | B2 | * | 11/2011 | Maahs ................... G01F 1/3209 |
| | | | | 73/861.22 |
| 10,385,761 | B1 | * | 8/2019 | Napurano ............. B08B 9/0325 |
| 2002/0073971 | A1 | | 6/2002 | Katayama |
| 2002/0104502 | A1 | | 8/2002 | Tsubouchi et al. |

OTHER PUBLICATIONS

Search Report & Written Opinion issued in Int'l Appl. No. PCT/GB20/50862 (dated Jul. 3, 2020).

* cited by examiner

MARINE OUTBOARD MOTOR WITH IMPROVED FLOW SENSING

CROSS REFERENCE TO RELATED APPLICATIONS

This application claims priority to United Kingdom patent application no. 1904773.7, filed Apr. 4, 2019. The disclosure set forth in the referenced application is incorporated herein by reference in its entirety.

TECHNICAL FIELD

The present invention relates to a marine outboard motor with an internal combustion engine comprising an air intake duct in which a flow meter is located to generate a signal indicative of a flow rate of the flow of air through the air intake duct.

BACKGROUND

In modern internal combustion engines, it is known to obtain a flow rate measurement of the air entering the engine via the air intake. This air flow rate measurement enables the engine control unit (ECU) to control air flows into the engine, for example for smoke limitation control, exhaust gas recirculation (EGR) control, or to ensure that the correct fuel mass is delivered. In automotive applications, air flow rate measurements are typically obtained using a hot wire or hot film mass airflow sensor located in the air intake system. Hot wire mass airflow sensors operate by heating a wire suspended in an air intake duct with either a constant current or a constant voltage. When air flows past the wire, the wire cools and its resistance decreases. The current or voltage is then increased to increase the temperature and resistance of the wire to return the resistance to equilibrium. The increase or decrease in current or voltage required to reach equilibrium is proportional to the flow rate and is output as a proportional signal from the sensor to the ECU. Hot film mass airflow sensors are similar to hot wire mass airflow sensors but use a hot film grid rather than a hot wire and normally output a frequency signal.

While hot wire and hot film mass airflow sensors are effective for automotive applications, the use of such sensors in a marine environment can be problematic due to their sensitivity to salt spray or humidity in the intake air. This can lead to inaccurate sensor readings and to poor sensor durability. Both of these factors can be detrimental to the performance of the engine. This can be a particularly important for modern diesel outboard motors in which air flow measurement can be important for effective smoke limitation and EGR control required to meet emissions regulations.

The present invention seeks to provide an improved marine outboard motor which overcomes or mitigates one or more problems associated with the prior art.

SUMMARY OF THE INVENTION

According to a first aspect of the present invention, there is provided a marine outboard motor having an internal combustion engine, the internal combustion engine comprising: an engine block defining at least one cylinder; an air intake configured to deliver a flow of air to the at least one cylinder; an air intake duct forming part of an air intake path for delivering the flow of air to the air intake; and a flow sensing arrangement comprising a flow meter located in the air intake duct and configured to generate a signal indicative of a flow rate of the flow of air through the air intake duct, and a bluff body located in the air intake duct upstream of the flow meter, wherein the flow meter is a vortex shedding flow meter.

With this arrangement, the bluff body causes flow separation in the flow of air passing along the air intake duct to generate vortices. The frequency of the resulting vortices is proportional to the flow rate. Thus, by measuring the vortex frequency, the flow meter can output to the ECU a signal indicative of flow rate without the use of hot wires, hot films, or any other components which are particularly sensitive to salt or humidity in the flow of air. This can facilitate more accurate flow sensing and reduce the required service interval for the engine that might otherwise be required.

The air intake path may comprise a single air duct by which the flow of air is delivered to the air intake duct from a single source, such as an air filter or air cooler.

Preferably, the air intake path comprises a plurality of air ducts connected to an inlet end of the air intake duct upstream of the bluff body by which the flow of air is delivered to the air intake duct from a plurality of sources.

With this arrangement, the generation of vortices in the air intake duct by the bluff body not only provides improved flow sensing in a marine environment but also facilitates mixing of intake air coming from different sources along the plurality of air ducts. This leads to improved homogeneity in the intake air and can facilitate more consistent engine performance, particularly where the intake air from the different sources has a different temperature, pressure, and/or composition. Thus, the flow sensing arrangement has the dual function of improved intake air mixing and improved flow rate sensing, both of which can lead to more consistent engine performance.

The flow of air may be supplied from any suitable air source. For example from one or more of an air filter, an air cooler, or a compressor housing of a turbocharger.

Preferably, the internal combustion engine further comprises an exhaust gas recirculation system configured to recirculate a portion of a flow of exhaust gas from the at least one cylinder to the inlet of the end of the air intake duct via one of the plurality of air ducts.

With this arrangement, the generation of vortices in the air intake duct by the bluff body not only provides improved flow sensing in a marine environment but also facilitates improved mixing of intake air supplied by the EGR system with air supplied by a different source of intake air. This is particularly useful with exhaust gas recirculation in which the composition and temperature of the intake air from the EGR system will be different to that of the intake air from other sources. Thus, the flow sensing arrangement has the dual function of improved intake air mixing and improved flow rate sensing, both of which can lead to more consistent engine performance.

Preferably, the internal combustion engine further comprises an intake air cooler connected to the inlet end of the air intake duct via one of the plurality of air ducts.

With this arrangement, the generation of vortices in the air intake duct by the bluff body not only provides improved flow sensing in a marine environment but also facilitates improved mixing of intake air supplied by the intake air cooler with air supplied by a different source of intake air. This can be particularly useful when an intake air cooler is used, since the temperature of the intake air from the cooler is likely to be lower than that of the intake air from other sources. Thus, the flow sensing arrangement has the dual function of improved intake air mixing and improved flow rate sensing, both of which can lead to more consistent engine performance.

Preferably, the bluff body has a flat upstream surface which is transverse to the flow of air in the air intake duct. The flat upstream surface preferably has protruding edges. This can help to generate predictable and controlled flow separation at different flow rates.

The flat upstream surface may extend across at least 10 percent of the flow area of the air intake duct, preferably at least 20 percent, at least 30 percent, at least 40 percent, at least 50 percent, or at least 60 percent of the flow area of the air intake duct. In certain embodiments, the flat upstream surface may extend across at least 70 percent of the flow area of the air intake duct, or at least 80 percent. Each of these values can help facilitate vortex generation in substantially all of the air flow through the air intake duct to improve intake air mixing and flow sensing accuracy.

The air intake duct may be a single channel in which the bluff body is located.

Preferably, the air intake duct is bifurcated around the bluff body and converges to a single channel downstream of the bluff body. The flow meter is preferably located in the single channel. As such, the air intake duct splits the flow of intake air into two air paths around the bluff body and combines the two air paths into one downstream of the bluff body.

The air intake duct may have any suitable structure. For example, the air intake duct may comprise an external conduit mounted to the engine block.

Preferably, the marine outboard motor further comprises a protective cover removably attached to the internal combustion engine, wherein the protective cover defines at least part of the air intake duct.

With this arrangement, the overall size and weight of the motor can be reduced as compared to air ducts that run along the engine block separate from the protective cover. The protective cover itself may also act as a thermal shield protecting the intake air from the heat generated by the engine block.

The air intake duct may be partly defined by the protective cover. In such embodiments, the air intake duct may comprise a first length of duct which is defined by the protective cover and a second length of duct which is connected to the first length of duct. Preferably, substantially the entire length of the air intake duct is defined by the protective cover.

The protective device may be a timing device cover. In other words, the protective cover may be used to cover timing parts of the internal combustion engine, such as timing wheels and their corresponding timing belts or timing chains. The protective cover may be removed from the outboard motor in order to service the timing devices.

The protective device may be configured to cover a top end of a crankshaft of the internal combustion engine which is arranged to rotate about a substantially vertical crankshaft axis. The crankshaft may comprise a flywheel. The protective cover may be configured to at least partly cover the flywheel.

The protective cover may comprise a service opening which provides access to a top end of the internal combustion engine from outside the protective cover.

With this arrangement, the top end of the engine can be accessed via the service opening without removing the protective cover. It may thus be possible to allow an eye bolt to be screwed into a boss on the top end of the engine, such as a flywheel boss, via the service opening, for the purpose of lifting the engine. The service opening may extend between an outer surface and an inner surface of the protective cover.

The protective cover may comprise a service flap covering the service opening. The service flap may be pivotable between an operating position and the maintenance position. In the operating position, the service flap may be closed, thereby covering the service opening such that intake air is prevented from escaping from the air intake duct via the service opening. In the maintenance position, the service flap is pivoted away from the service opening to open the service opening, such that an operator can gain access to parts of the internal combustion engine located the service opening.

Preferably, the bluff body is at least partly defined by an outer surface of an annular wall located in the air intake duct, wherein the service opening is defined within a region bounded by an inner surface of the annular wall. With this arrangement, the service opening and the bluff body can be co-located. This can minimise unnecessary disruption to the air flow caused by the presence of the service opening. The service opening may be defined by the inner surface of the annular wall.

The internal combustion engine preferably comprises a crankshaft arranged to rotate about a substantially vertical crankshaft axis, wherein the protective cover covers a top end of the crankshaft and wherein the service opening provides access to the top end of the crankshaft.

The protective cover may be a single integral component.

Preferably, the protective cover comprises a first shell removably attached to the internal combustion engine and a second shell removably attached to the first shell, the first and second shells together defining the air intake duct. Constructing the protective cover with removable half-shells can simplify maintenance of the protective cover and of engine components located beneath the protective cover. The first half-shell and the second half-shell may comprise a plurality of corresponding mounting holes arranged to receive fastening members. Where the protective cover comprises a service opening, the service opening may extend through the first shell and the second shell. In such embodiments, the service opening provides access to a top end of the internal combustion engine without the need to remove the second shell. In other embodiments, the service opening may be arranged on the first shell only. In such embodiments, the second shell must be removed to access the service opening.

Preferably, the internal combustion engine is a vertical axis internal combustion engine. In such an engine, the crankshaft is mounted vertically in the engine. The internal combustion engine may be a petrol engine. Preferably, the internal combustion engine is a diesel engine. The internal combustion engine may be a turbocharged diesel engine.

As used herein, the term "engine block" refers to a solid structure in which the at least one cylinder of the engine is provided. The term may refer to the combination of a cylinder block with a cylinder head and crankcase, or to the cylinder block only. The engine block may be formed from a single engine block casting. The engine block may be formed from a plurality of separate engine block castings which are connected together, for example using bolts.

The engine block may comprise a single cylinder. Preferably, the engine block comprises a plurality of cylinders.

The engine block may comprise a single cylinder bank.

The engine block may comprise a first cylinder bank and a second cylinder bank. The first and second cylinder banks may be arranged in a V configuration.

The engine block may comprise three cylinder banks. The three cylinder banks may be arranged in a broad arrow configuration. The engine block may comprise four cylinder banks. The four cylinder banks may be arranged in a W or double-V configuration.

According to a second aspect of the present invention, there is provided a marine vessel comprising a marine outboard motor according to the first aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Further features and advantages of the present invention will be further described below, by way of example only, with reference to the accompanying drawings in which.

DETAILED DESCRIPTION

Figure 1:
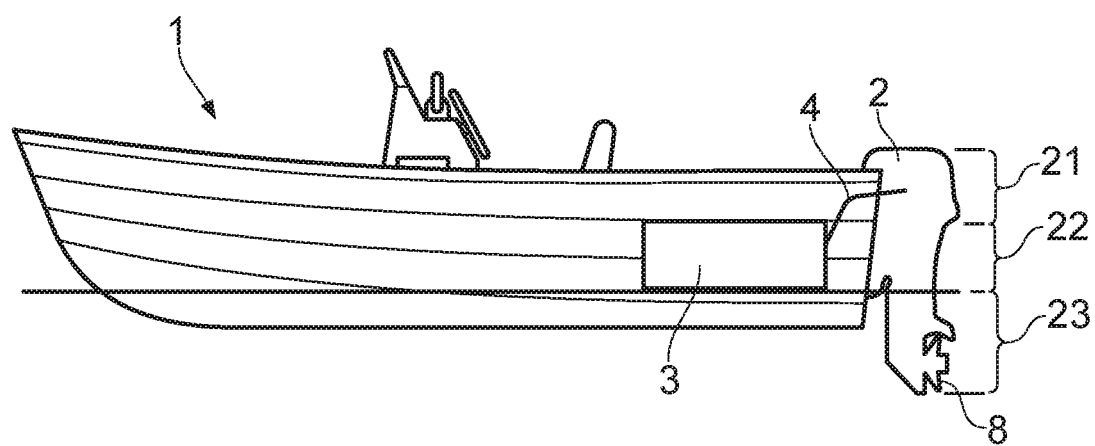
FIG. 1 is a schematic side view of a light marine vessel provided with a marine outboard motor.

FIG. 1 shows a schematic side view of a marine vessel 1 with a marine outboard motor 2. The marine vessel 1 may be any kind of vessel suitable for use with a marine outboard motor, such as a tender or a scuba-diving boat. The marine outboard motor 2 shown in FIG. 1 is attached to the stern of the vessel 1. The marine outboard motor 2 is connected to a fuel tank 3, usually received within the hull of the marine vessel 1. Fuel from the reservoir or tank 3 is provided to the marine outboard motor 2 via a fuel line 4. Fuel line 4 may be a representation for a collective arrangement of one or more filters, low pressure pumps and separator tanks (for preventing water from entering the marine outboard motor 2) arranged between the fuel tank 3 and the marine outboard motor 2.

As will be described in more detail below, the marine outboard motor 2 is generally divided into three sections, an upper-section 21, a mid-section 22, and a lower-section 23. The mid-section 22 and lower-section 23 are often collectively known as the leg section, and the leg houses the exhaust system. A propeller 8 is rotatably arranged on a propeller shaft at the lower-section 23, also known as the gearbox, of the marine outboard motor 2. Of course, in operation, the propeller 8 is at least partly submerged in water and may be operated at varying rotational speeds to propel the marine vessel 1.

Typically, the marine outboard motor 2 is pivotally connected to the stern of the marine vessel 1 by means of a pivot pin. Pivotal movement about the pivot pin enables the operator to tilt and trim the marine outboard motor 2 about a horizontal axis in a manner known in the art. Further, as is well known in the art, the marine outboard motor 2 is also pivotally mounted to the stern of the marine vessel 1 so as to be able to pivot, about a generally upright axis, to steer the marine vessel 1.

Tilting is a movement that raises the marine outboard motor 2 far enough so that the entire marine outboard motor 2 is able to be raised completely out of the water. Tilting the marine outboard motor 2 may be performed with the marine outboard motor 2 turned off or in neutral. However, in some instances, the marine outboard motor 2 may be configured to allow limited running of the marine outboard motor 2 in the tilt range so as to enable operation in shallow waters. Marine engine assemblies are therefore predominantly operated with a longitudinal axis of the leg in a substantially vertical direction. As such, a crankshaft of an engine of the marine outboard motor 2 which is substantially parallel to a longitudinal axis of the leg of the marine outboard motor 2 will be generally oriented in a vertical orientation during normal operation of the marine outboard motor 2, but may also be oriented in a non-vertical direction under certain operating conditions, in particular when operated on a vessel in shallow water. A crankshaft of a marine outboard motor 2 which is oriented substantially parallel to a longitudinal axis of the leg of the engine assembly can also be termed a vertical crankshaft arrangement. A crankshaft of a marine outboard motor 2 which is oriented substantially perpendicular to a longitudinal axis of the leg of the engine assembly can also be termed a horizontal crankshaft arrangement.

Figure 2A:
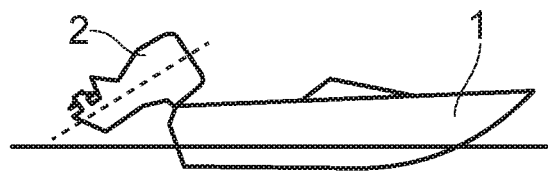
FIG. 2A shows a schematic representation of a marine outboard motor in its tilted position.

As mentioned previously, to work properly, the lower-section 23 of the marine outboard motor 2 needs to extend into the water. In extremely shallow waters, however, or when launching a vessel off a trailer, the lower-section 23 of the marine outboard motor 2 could drag on the seabed or boat ramp if in the tilted-down position. Tilting the marine outboard motor 2 into its tilted-up position, such as the position shown in FIG. 2A, prevents such damage to the lower-section 23 and the propeller.

Figure 2B:
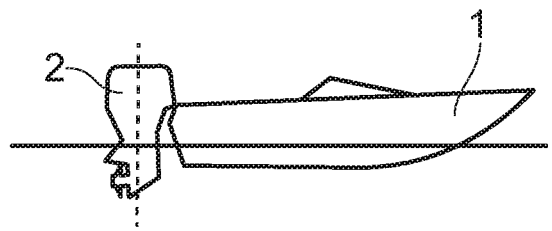
FIGS. 2B to 2D show various trimming positions of the marine outboard motor and the corresponding orientation of the marine vessel within a body of water.
Figure 2C:
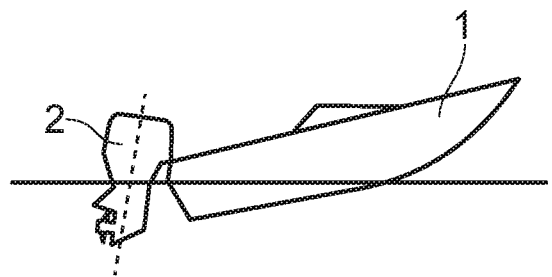
Figure 2D:
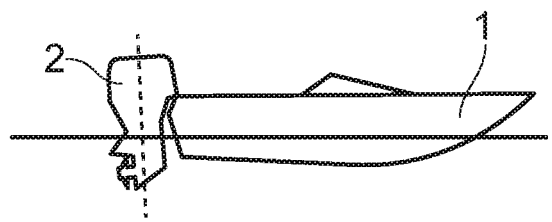

By contrast, trimming is the mechanism that moves the marine outboard motor 2 over a smaller range from a fully-down position to a few degrees upwards, as shown in the three examples of FIGS. 2B to 2D. Trimming helps to direct the thrust of the propeller 8 in a direction that will provide the best combination of fuel efficiency, acceleration and high speed operation of the marine vessel 1.

When the vessel 1 is on a plane (i.e. when the weight of the vessel 1 is predominantly supported by hydrodynamic lift, rather than hydrostatic lift), a bow-up configuration results in less drag, greater stability and efficiency. This is generally the case when the keel line of the boat or marine vessel 1 is up about three to five degrees, such as shown in FIG. 2B for example.

Too much trim-out puts the bow of the vessel 1 too high in the water, such as the position shown in FIG. 2C. Performance and economy, in this configuration, are decreased because the hull of the vessel 1 is pushing the water and the result is more air drag. Excessive trimmingout can also cause the propeller to ventilate, resulting in further reduced performance. In even more severe cases, the vessel 1 may hop in the water, which could throw the operator and passengers overboard.

Trimming-in will cause the bow of the vessel 1 to be down, which will help accelerate from a standing start. Too much trim-in, shown in FIG. 2D, causes the vessel 1 to "plough" through the water, decreasing fuel economy and making it hard to increase speed. At high speeds, trimming-in may even result in instability of the vessel 1.

Referring firstly to FIG. 1, there is shown a schematic side view of a marine vessel 1 with an outboard motor 2. The marine vessel 1 may be any kind of vessel suitable for use with an outboard motor, such as a tender or a scuba-diving boat. The outboard motor 2 shown in FIG. 1 is attached to the stern of the vessel 1. The outboard motor 2 is connected to a fuel tank 3, usually received within the hull of the marine vessel 1. Fuel from the reservoir or tank 3 is provided to the outboard motor 2 via a fuel line 4. Fuel line 4 may be a representation for a collective arrangement of one or more filters, low pressure pumps and separator tanks (for preventing water from entering the outboard motor 2) arranged between the fuel tank 3 and the outboard motor 2.

Figure 3:
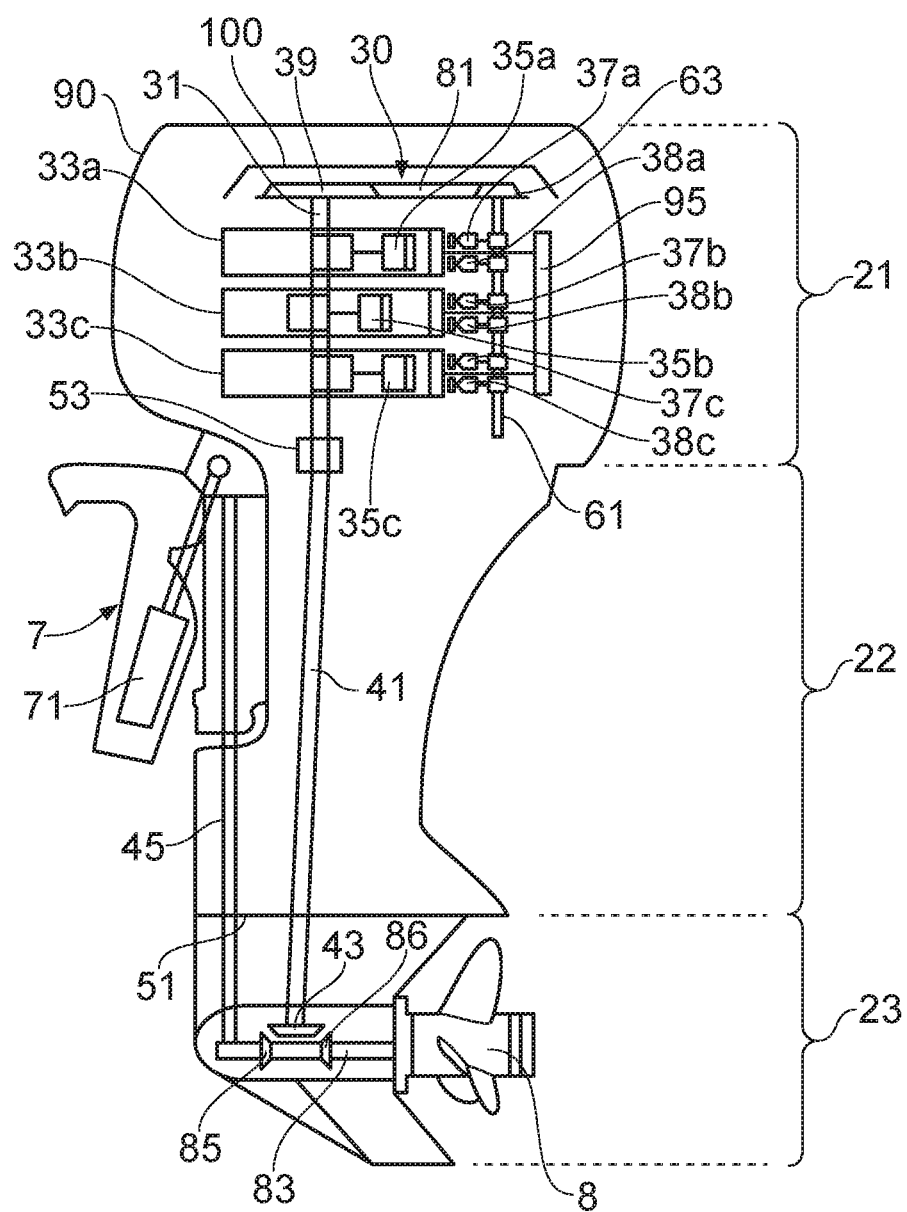
FIG. 3 shows a schematic cross-section of a marine outboard motor according to the present invention.

Turning to FIG. 3, there is shown a schematic cross-section of an outboard motor 2 according to an embodiment of the present invention. The outboard motor 2 comprises a tilt and trim mechanism 7 for performing the aforementioned tilting and trimming operations. In this embodiment, the tilt and trim mechanism 7 includes a hydraulic actuator 71 that can be operated to tilt and trim the outboard motor 2 via an electric control system. Alternatively, it is also feasible to provide a manual tilt and trim mechanism, in which the operator pivots the outboard motor by hand.

As mentioned above, the outboard motor 2 is generally divided into three sections. An upper-section 21, also known as the powerhead, includes an internal combustion engine 30 for powering the marine vessel 1. A cowling 25 is disposed around the engine 30. Adjacent to, and extending below, the upper-section 21 or powerhead, there is provided a mid-section 22 and a lower section 23. The lower-section 23 extends adjacent to and below the mid-section 22, and the mid-section 22 connects the upper-section 21 to the lower-section 23. The mid-section 22 houses a drive shaft 41 which extends between the combustion engine 30 and the propeller shaft 83 and is connected to a crankshaft 31 of the combustion engine via a floating connector 53 (e.g. a splined connection). At the lower end of the drive shaft 41, a gear box/transmission is provided that supplies the rotational energy of the drive shaft 41 to the propeller 8 in a horizontal direction. In more detail, the bottom end of the drive shaft 41 may include a bevel gear 43 connected to a pair of bevel gears 85 and 86 that are rotationally connectable to the propeller shaft 83 of the propeller 8 by a shift mechanism (not shown). The mid-section 22 and lower-section 23 form an exhaust system, which defines an exhaust gas flow path for transporting exhaust gases from an exhaust gas outlet of the internal combustion engine 30 and out of the outboard motor 2. An anti-ventilation plate 51, which prevents surface air from being sucked into the negative pressure side of the propeller 8, separates the mid-section 22 from the lower-section 23. The motor 2 further includes a shift rod 45 extending into the transmission by which the shift mechanism is operated.

The combustion engine 30 shown schematically in FIG. 3 includes a variety of combustion chambers/cylinders 33*a*, 33*b*, and 33*c*. Each of the combustion cylinders 33*a*, 33*b*, and 33*c* is provided with a moveable piston 35*a*, 35*b*, and 35*c*. Each of the pistons 35*a* to 35*c* is connected at its back end to a crankshaft 31 as is well known in the art. The pistons 35*a* to 35*c* separate the crankshaft 31 from the combustion section of the cylinders 33*a* to 33*c*, that is, from inlet and outlet ports controlled by corresponding inlet valves 37*a*, 37*b*, 37*c* and outlet valves 38*a*, 38*b* and 38*c*. In FIG. 3, the engine is illustrated in the form of a schematic representation of one side of a four-stroke V6 diesel engine. It will be understood that any other amount of cylinders may be employed in the V-shaped cylinder banks. The skilled person will also understand that any other arrangement, such as an in-line arrangement could alternatively be utilised. Finally, while FIG. 3 illustrates a four-stroke-type engines, the drive system of the present invention could equivalently be constructed as a two-stroke-type combustion engine.

At its upper end, the crankshaft 31 is provided with a flywheel 39. Although not shown in detail in FIG. 3, the flywheel includes a pulley connected to the crankshaft. The crankshaft pulley is connected to a drive pulley 63 of a camshaft 61 via a timing belt 81. It will be understood that FIG. 3 only shows one cylinder bank. As such, a substantially identical, second camshaft can be provided for the second cylinder bank of the V6 engine, said second camshaft being connected to the fly wheel 39 via a second timing belt.

The camshaft 61 extends parallel to the crankshaft 31, i.e. along a substantially vertical axis in FIG. 3. As is generally known, the camshaft 61 includes a variety of cams for actuating the inlet and outlet valves 37*a*, 37*b*, 37*c*, 38*a*, 38*b*, 38*c*, in an accurately timed fashion. The rotational speed ratio between the crankshaft and the camshaft is conventionally set by means of the flywheel, pulleys and their corresponding timing belt. These parts of the internal combustion engine are, therefore, commonly referred to as timing devices.

In order to protect the timing devices from environmental influences, such as water and dust, and to prevent risk of harm to the operator, a protective cover 100 may be arranged on top of the engine block 30. Although in FIG. 3, the protective cover 100 is illustrated covering the top end of the engine block 30, it will be appreciated that the protective cover could also be arranged to span any other part of the engine block 30. The protective cover 100 is discussed in more detail below in relation to FIGS. 5 and 6.

Figure 4:
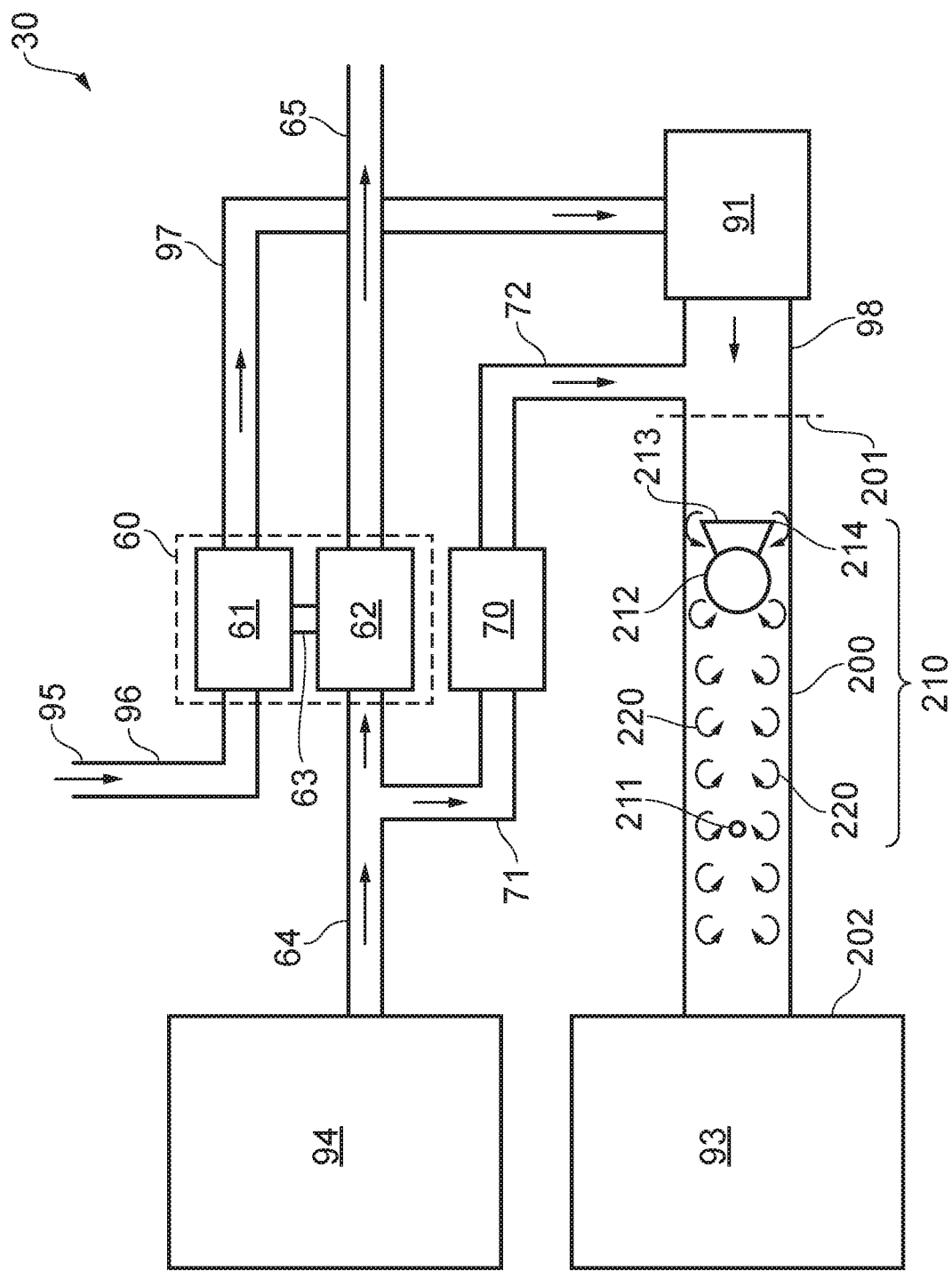
FIG. 4 shows a schematic illustration of the gas flows around the internal combustion engine shown in FIG. 3.

FIG. 4 is a schematic illustration of gas flows to and from the internal combustion engine 30. The internal combustion engine 30 includes an air intake manifold 93 by which a flow of air is delivered to the cylinders of the engine, and an exhaust manifold 94 by which exhaust gases are removed from the cylinders. The engine 30 further includes an air intake duct 200 forming part of an air intake path for delivering the flow of air to the air intake manifold 93. Also positioned along the air intake path is an air inlet 95, a turbocharger 60, a charge air cooler 91, and an exhaust gas circulation system 70. The turbocharger 60 has a compressor housing 61 and a turbine housing 62 connected by a shaft 63. The turbine housing 61 is connected on its inlet side to the exhaust manifold 94 by an exhaust manifold duct 64 and is connected on its outlet side to the exhaust system of the marine outboard motor by a turbocharger exhaust duct 65. The compressor housing 62 is connected on its inlet side to the air inlet 95 by an inlet duct 96 and is connected on its outlet side to the charge air cooler 91 by a compressor outlet duct 97. The charge air cooler 91 is connected on its outlet side to the air intake duct 200 by a charge air duct 98. The EGR system 70 includes an EGR cooler which is connected on its inlet side to the exhaust manifold duct 64 by hot EGR duct 71. The hot EGR duct 71 is branched off from the exhaust manifold duct 64 at a location upstream of the turbocharger 60. The outlet side of the EGR cooler is connected to the air intake duct 200 by a cooled EGR duct 72. The charge air cooler 91 and the EGR system 70 represent a plurality of air sources for the air intake duct 200. The charge air duct 98 and the cooled EGR duct 72 represent a plurality of air ducts by which the flow of air is delivered to the air intake duct 200 from the plurality of air sources.

During operation, exhaust gases are expelled from each cylinder in the engine and are directed away from the cylinders by the exhaust manifold 93 and into the exhaust manifold duct 64. Where exhaust gas recirculation is required, a portion of the exhaust gases are diverted from the exhaust manifold duct 64 to the EGR system 70 via the hot EGR duct 71. The remaining exhaust gases are delivered to the turbine housing 61 of the turbocharger 60 where they are used to drive the turbine before exiting the turbocharger 60 and the engine via the turbocharger exhaust duct 65. The recirculated exhaust gases are cooled by the EGR cooler and are delivered to the inlet end 201 of the air intake duct 200 by the cooled EGR duct 72. Meanwhile, ambient air is drawn into the compressor housing 62 through the air inlet 95 and the inlet duct 96 and is pressurised by the spinning compressor. The pressurised air is delivered from the compressor housing 62 to the charge air cooler 91 by the compressor outlet duct 97 and flows into an inlet end 201 of the air intake duct 200 via the charge air duct 98. The cooled pressurised air from the charge air cooler 91 and the cooled exhaust gas from the EGR system 70 flow together along the air intake duct 200 as a flow of air which is then delivered to the air intake manifold 93 through an outlet end 202 of the air intake duct 200.

To facilitate measurement of air flows into the engine, the internal combustion engine 30 includes a flow sensing arrangement 210 located in the air intake duct 200. The flow sensing arrangement 210 includes a flow meter 211 and a bluff body 212 which is located upstream of the flow meter 211. The bluff body 212 has a flat upstream surface 213 which is arranged transverse to the flow of air in the air intake duct 200. The flat upstream surface 213 has protruding edges 214 which extend into the flow of air to encourage flow separation and vortex generation in the flow of air. The flow meter 211 is a vortex shedding flow meter configured to generate a signal indicative of the flow rate of the flow of air in the air intake duct 200. In this example, the flow meter 211 measures the frequency of vortices 220 in the air intake duct 200 and outputs this measurement as a frequency signal to the engine control unit (not shown). The ECU calculates the flow rate based on the frequency signal, as would be understood by a person skilled in the art.

Figure 5:
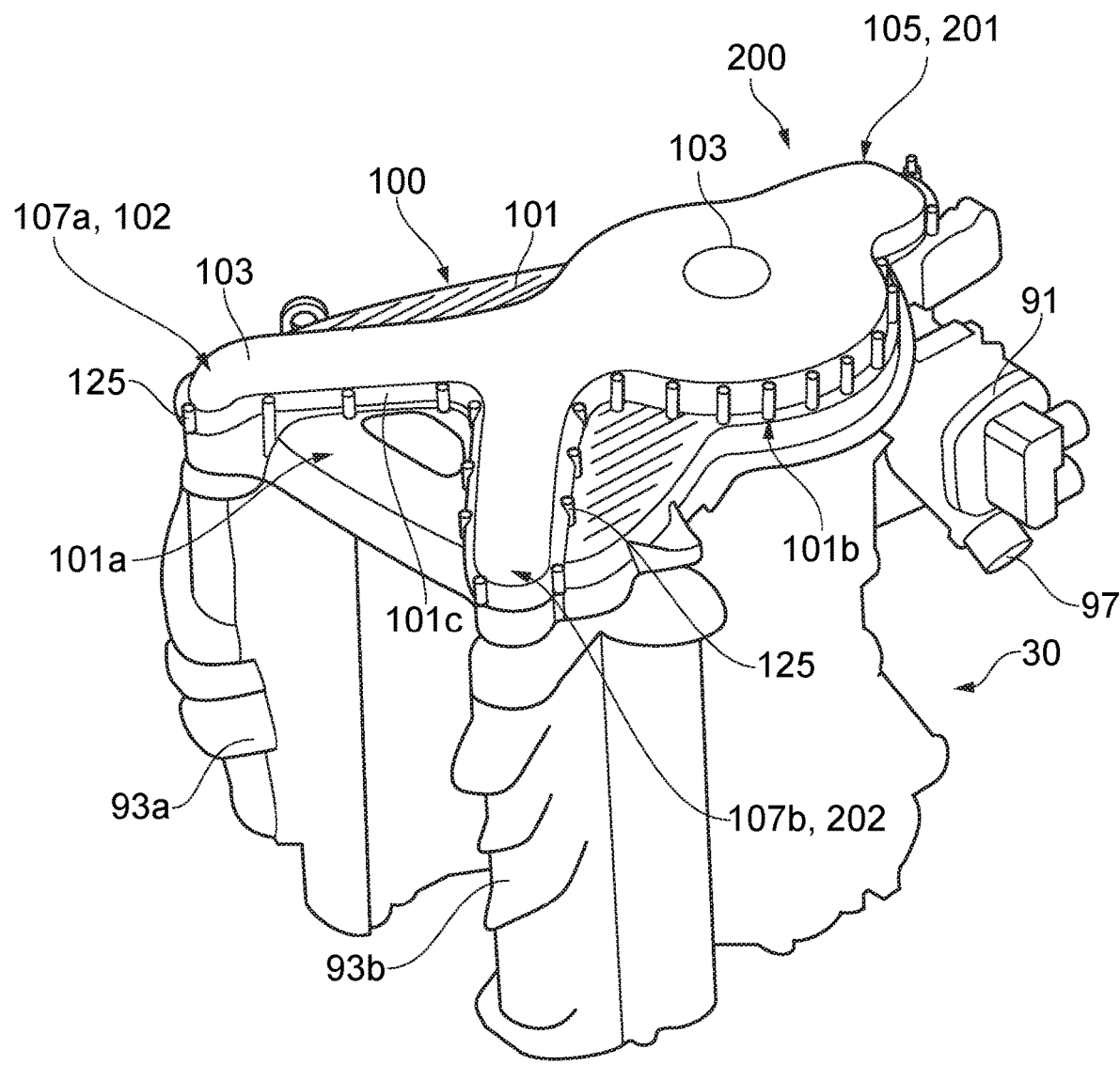
FIG. 5 shows a perspective view of the internal combustion engine and protective cover of the marine outboard motor shown in FIG. 3.

FIG. 5 shows a perspective view of the internal combustion engine in which the air intake duct is incorporated in the protective cover. As shown, the internal combustion engine 30 includes a removable protective cover 100 spanning the top part of the engine block and protecting the timing devices. The protective cover 100 is removably attached to the internal combustion engine 30 to allow easy access for maintenance purposes. The protective cover 100 comprises a main body 101 and a removable cover 103 forming at least part of the air intake duct 200. The main body 101 has a triangular first part 101a and a circular second part 101b. The first part 101a is configured to cover the timing devices and camshafts of the internal combustion engine. The second part 101b is configured to cover the flywheel of the crankshaft. The main body further includes a raised flange 101c which defines an open channel forming a lower section of the air intake duct 200. The removable cover 103 is removably attached over the main body 101 via a plurality of mounting holes 125 arranged along an outer edge of the removable cover 103 and along the raised flange 101c of the main body 101. The removable cover 103 closes the open channel defined by the raised flange 101c to form the air intake duct 200. In this manner, the main body 101 provides a first, lower shell of the air intake duct and the removable cover 103 provides a second, upper shell of the air intake duct, wherein the first and second shells combine to define the air intake duct. In other examples, the protective cover may be a single piece which defines the air intake duct, rather than a two piece construct comprising a main body and a removable cover. The air intake duct 200 is bifurcated and substantially Y-shaped, having a single inlet 105 at the inlet end 201 and two outlets 107a, 107b at the opposite outlet end 202. The inlet 105 is connected to the intake air cooler 91. The air outlets 107a, 107b are arranged at an opposite end to the air inlet 105. Each of the air outlets 107a, 107b is connected to a respective intake manifold 93a, 93b. As such, the air intake duct 200 provides cooled intake air from the intake air cooler 91 to both intake manifolds 93a, 93b across the top end of the engine. The protective cover 100 further includes a service opening 127 which provides access to the top end of the internal combustion engine from outside of the protective cover 100. In this example, the service opening 127 is circular and extends through both the main body 101 and the removable cover 103 to provide access to the top end of the crankshaft. In other examples, the service opening may have a different shape and/or may extend only through the main body 101 such that it is closed by the provision of the removable cover 103.

Figure 6:
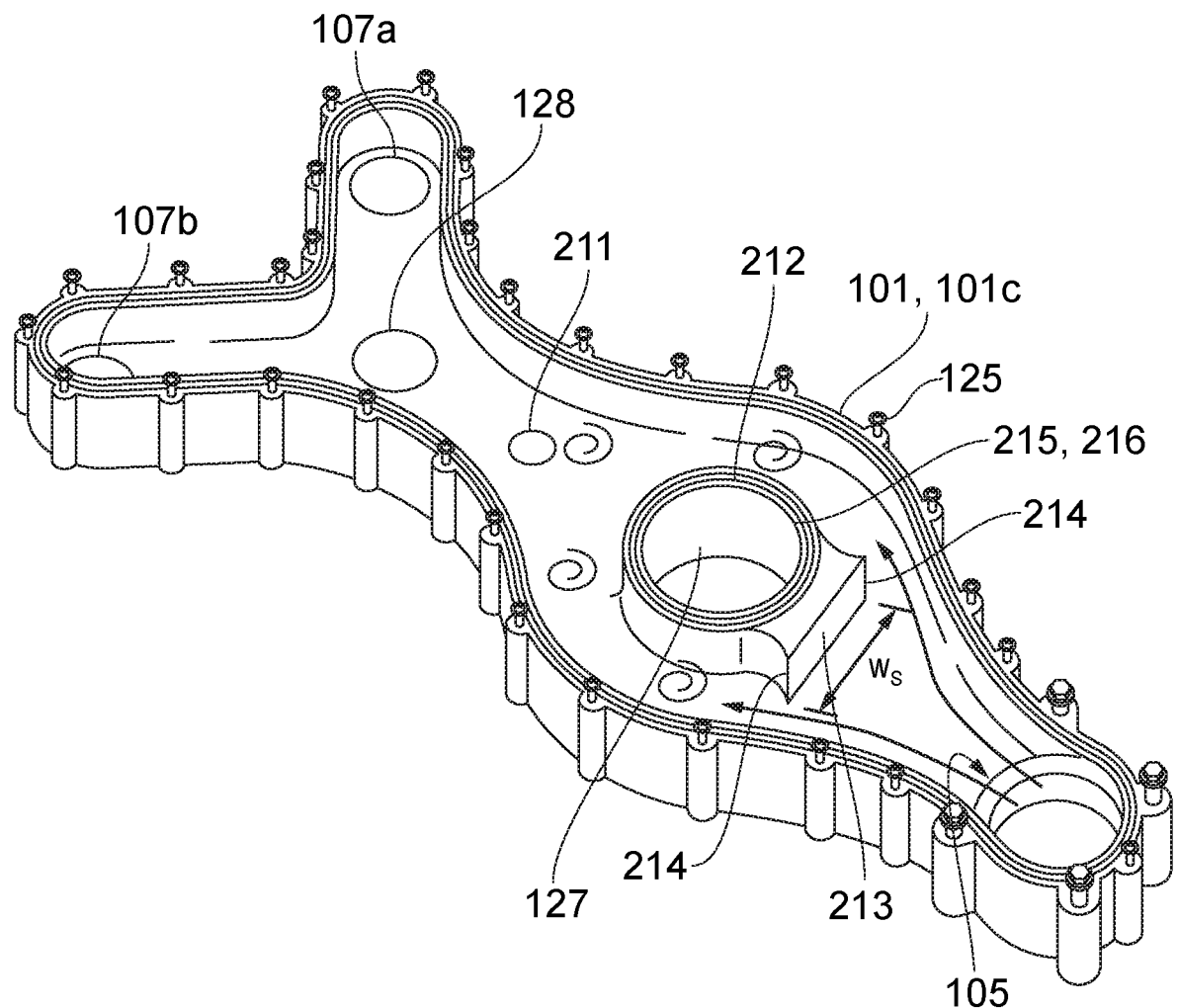
FIG. 6 shows a perspective view of an upper region of the protective cover of FIG. 5, in which the top cover has been removed.

FIG. 6 shows an upper region of the protective cover of the internal combustion engine of FIG. 5, in which the removable cover of the protective cover is removed. As can be seen, the bluff body 212 of the flow sensing arrangement 210 in the air intake duct 200 comprises a cylindrical portion 215 downstream of the flat upstream surface 213. The cylindrical portion 215 is defined by an outer surface of an annular wall 216 which extends upwards from the bottom of the open channel of the raised flange 101c of the main body 101. The service opening 127 through the main body 101 is defined by the inner surface of the annular wall 216. Thus, the service opening 127 and the bluff body 212 are co-located in the air intake duct 200. The air intake duct 200 is bifurcated around the service opening 127 in a toroidal portion and converges into a single channel portion downstream of the toroidal portion. The flow meter 211 is located in the single channel portion. The air intake duct 200 has an overall width Wd. The flat upstream surface 213 of the bluff body extends substantially perpendicular to the flow of air in the duct 200 and has a width Ws which is at least 40 percent of the overall width Wd of the duct 200 in this region. The protective cover 100 also includes a further service opening 128 which extends through the main body 101 towards the outlet end of the air intake duct 200. The further service opening 128 enables the operator to gain quick access to the timing devices of the engine if the removable cover 103 is removed, without the need the entire protective cover 100 to be removed. In order to close the service opening 128 during normal use, a service flap (not shown) may be provided at a lower end of the service opening 128.

During operation, the flow of air enters the air intake duct 200 defined between the main body 101 and the removable cover 103 through the inlet 105. Upon reaching the bluff body 212, the flow impacts against the upstream surface 213 generating vortices in the air flow. The air follows two separate paths around the bluff body 212 in the toroidal portion and combines in the single channel portion whereby the flow meter detects the frequency of the vortices to output a signal indicative of the flow rate of the air flow. From the single channel portion, the duct 200 bifurcates again to split the air flow between the two intake manifolds.

Although the invention has been described above with reference to one or more preferred embodiments, it will be appreciated that various changes or modifications may be made without departing from the scope of the invention as defined in the appended claims.

The invention claimed is:

1. A marine outboard motor having an internal combustion engine, the internal combustion engine comprising:
   an engine block defining at least one cylinder;
   an air intake configured to deliver a flow of air to the at least one cylinder;
   an air intake duct forming part of an air intake path for delivering the flow of air to the air intake;
   a flow sensing arrangement located in the air intake duct and comprising a flow meter configured to generate a signal indicative of a flow rate of the flow of air through the air intake duct, and a bluff body located in the air intake duct upstream of the flow meter, wherein the flow meter is a vortex shedding flow meter;
   a protective cover removably attached to the internal combustion engine, wherein the protective cover defines at least part of the air intake duct, the protective cover comprising a service opening which provides access to a top end of the internal combustion engine from outside the protective cover; and
   wherein the protective cover further comprises an annular wall located in the air intake duct, wherein the bluff body is at least partly defined by an outer surface of the annular wall and wherein the service opening is defined within a region bounded by an inner surface of the annular wall.

2. The marine outboard motor of claim 1, wherein the air intake path comprises a plurality of air ducts connected to an inlet end of the air intake duct upstream of the bluff body by which the flow of air is delivered to the air intake duct from a plurality of sources.

3. The marine outboard motor of claim 2, wherein the internal combustion engine further comprises an exhaust gas recirculation system configured to recirculate a portion of a flow of exhaust gas from the at least one cylinder to the inlet end of the air intake duct via one of the plurality of air ducts.

4. The marine outboard motor of claim 2, wherein the internal combustion engine further comprises an intake air cooler connected to the inlet end of the air intake duct via one of the plurality of air ducts.

5. The marine outboard motor of claim 1, wherein the bluff body has a flat upstream surface which is transverse to the flow of air in the air intake duct.

6. The marine outboard motor of claim 5, wherein the flat upstream surface extends across at least 40 percent of the flow area of the air intake duct.

7. The marine outboard motor of claim 1, wherein the air intake duct is bifurcated around the bluff body and converges to a single channel downstream of the bluff body, wherein the flow meter is located in the single channel.

8. The marine outboard motor of claim 1, wherein substantially the entire length of the air intake duct is defined by the protective cover.

9. The marine outboard motor of claim 1, wherein the protective cover is a timing device cover.

10. The marine outboard motor of claim 1, wherein the internal combustion engine comprises a crankshaft arranged to rotate about a substantially vertical crankshaft axis, wherein the protective cover covers a top end of the crankshaft and wherein the service opening provides access to the top end of the crankshaft.

11. The marine outboard motor of claim 1, wherein the protective cover comprises a first shell removably attached to the internal combustion engine and a second shell removably attached to the first shell, the first and second shells together defining the air intake duct.

12. The marine outboard motor of claim 1, wherein the internal combustion engine is a vertical axis internal combustion engine.

13. A marine vessel comprising the marine outboard motor of claim 1.

* * * * *